US006353522B1

(12) United States Patent
Akahane

(10) Patent No.: US 6,353,522 B1
(45) Date of Patent: Mar. 5, 2002

(54) SWITCHING STATE DETECTING DEVICE FOR SWITCH, AND ELECTRONIC APPARATUS

(75) Inventor: Hidehiro Akahane, Tatsuno-machi (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/530,722

(22) PCT Filed: Sep. 7, 1999

(86) PCT No.: PCT/JP99/04873

§ 371 Date: Jun. 28, 2000

§ 102(e) Date: Jun. 28, 2000

(87) PCT Pub. No.: WO00/14756

PCT Pub. Date: Mar. 16, 2000

(30) Foreign Application Priority Data

Sep. 7, 1998 (JP) .......................................... 10-252970

(51) Int. Cl.[7] ............................. H02H 3/42; H01H 9/54

(52) U.S. Cl. ............................ 361/78; 361/87; 323/284

(58) Field of Search .............................. 361/78, 87, 18, 361/93.1, 93.7; 323/276, 282, 284, 285; 307/135, 137; 324/103 R, 130

(56) References Cited

U.S. PATENT DOCUMENTS 4,353,103 A * 10/1982 Whitlow ...................... 361/45
5,056,148 A * 10/1991 Hayashi ....................... 381/11
5,294,881 A * 3/1994 Pierret et al. ................. 322/28

FOREIGN PATENT DOCUMENTS

JP 56-152120 11/1981
JP 58-43722 3/1983
JP 3-222215 10/1991
JP 5-183957 7/1993

* cited by examiner

*Primary Examiner*—Kim Huynh
(74) *Attorney, Agent, or Firm*—Mark P. Watson

(57) ABSTRACT

A control circuit of a switching state detecting device for a switch controls the value of a resistive element connected between one end of the switch (SW), of which the switching state is to be detected, and the power source or ground line, so the range of operating voltage can be widened, the current flowing at the time of switching on is suppressed so that power consumption of an electronic apparatus provided with the switching state detecting device for a switch is reduced, and improvement in detection precision can be made by causing the detection current to flow in a sure manner.

21 Claims, 12 Drawing Sheets

100B

SWITCHING STATE DETECTING DEVICE FOR SWITCH, AND ELECTRONIC APPARATUS

BACKGROUND OF THE INVENTION

1. Technical Field

The present invention relates to a switching state detecting device for a switch and to an electronic apparatus, and particularly relates to a switching state detecting device for a switch capable of detecting the switching state of a switch with lower electric power consumption and high precision, and to an electronic apparatus using this device.

2. Background Art

With common electronic apparatuses, various operations are performed by switches, but with electronic apparatuses which require low electrical power consumption, ways of keeping electric power consumed by detecting circuits to a minimum have been devised, in that the switching states of the switches are not continuously detected, but intermittently detected.

Description will be made regarding a configuration for detecting the switching state of switches used for such electronic apparatuses, with reference to FIG. 17. As shown in the Figure, one end of the switch SW regarding which the switching state is to be detected is grounded at a reference level Vdd at the high-potential side, and the other end is connected to a detecting circuit 900. Now, the detecting circuit 900 is made up of an n-channel field-effect transistor 910 and a latch circuit 930, with the drain of the transistor 910 being connected to the other end of the switch SW, and the source thereof connected to the negative side power source voltage Vss. Also, sampling pulses SP are supplied to the gate of the transistor 910.

The latch circuit 930 latches the voltage level of the signal line A connected to the other end of the switch SW with the trailing edge of the sampling pulse SP, and outputs a signal Out indicating the switching state of the switch SW.

With such a detecting circuit 900, the transistor 910 is on only during the period wherein the sampling pulse SP is at the "H" level, and the signal line A is pulled down to the power source voltage Vss by the on resistance thereof. According, the voltage level of the signal line A maintains the power source voltage Vss in the event that the switch SW is open during the period wherein the sampling pulse SP is at the "H" level, but conversely makes transition to the ground level in the event that the switch SW is closed.

Accordingly, a signal Out according to the switching state of the switch SW can be output by the latch circuit 930 latching the voltage level of the signal line A with the leading edge of the sampling pulse SP. Then, processing corresponding to the instruction of the switch is executed by a later circuit (omitted in the drawings) based on this signal out.

According to such a detecting circuit 900, no electrical current is constantly flowing between the drain/source of the transistor 910, so the electricity consumed in the detecting circuit 900 can be kept low.

Now, depending on the electronic apparatus applied, the power source voltage Vss may not be constant but vary with a certain width. For example, in the case of an electronic apparatus comprising an electricity generating mechanism and a battery mechanism, wherein the electricity generated by the electricity generating mechanism is stored in the battery mechanism, and the electricity stored in the battery mechanism is used as the power source, fluctuation of the power source voltage Vss due to the battery state is presupposed.

Now, general transistors have a nature wherein the lower the voltage between the source/drain is, the greater the on resistance thereof is, i.e., in straightforward terms, the resistance value properties as to voltage are non-linear. On the other hand, pulling down the signal line A with high resistance tends to make the voltage level thereof unstable. Accordingly, a transistor 910 of a type with a small on resistance must be used in order to stabilize the voltage level of the signal line A, whether the voltage between source/drain is low, or whether the difference between the power source voltage Vss and ground level is small.

However, with a configuration wherein the signal line A is pulled down with a transistor having small on resistance, the electric power consumption of the detecting circuit 900 has to increase, so not only does this go against the original object of lowering electric power consumption, but further creates a problem in that the range of power source voltage capable of detecting the switching state of the switch is restricted due to transistor properties.

This problem is marked in cases wherein the sampling rate is increased, in order to detect the switching state of the switch SW with high precision. The reason is as follows. That is, the line for the signal line A has parasitic capacity owing to the transistor 910, pads for extending lines for mounting, wiring, etc. Now, in the event that a charge is stored in this parasitic capacity due to some reason in the state of the switch SW being open, when the sampling pulse SP is at the "H" level the level of the signal line A changes over time according to a time-constant owing to the parasitic capacity and pulldown resistance. Accordingly, the signal line A is not determined at the "L" level state wherein the switch SW is open, until after pulling down for a certain amount of time. Thus, in order to raise the sampling rate, the pulse width of the sampling pulse SP must be secured to a certain level in order to take sufficient time for the level of the signal line A to be determined. This means nothing else than extending the amount of on time at the transistor 910.

The present invention has been made in light of the above problems, and it is an object thereof to provide a switching state detecting device for a switch capable of realizing both widening the power source voltage range capable of detecting the switching state of the switch, and improving detection precision of the switching state of the switch, and an electronic apparatus using this device.

DISCLOSURE OF INVENTION

A first form of the present invention comprises: a switch connected at one end to a ground line or a power source; a resistive element connected between the other end of the switch and a power source or a ground line; and a control unit for controlling the value of the resistive element based on a power source voltage which is the difference between the voltage level of the power source and the ground level of the ground line; wherein signals equivalent to the switching state of the switch corresponding to the voltage level at the other end of the switch are output.

Further, the first form of the present invention comprises a judging unit for judging, or determination unit that determines the voltage level at the other end of the switch and outputting signals equivalent to the switching state of the switch.

Further, the determination unit of the first form of the present invention performs determination of the voltage level at predetermined intervals.

Also, the control unit of the first form of the present invention controls the resistance value of the resistive element such that the resistance value of the resistive element does not exceed the predetermined upper limit resistance value.

Also, the control unit of the first form of the present invention controls the resistance value of the resistive element such that the resistance value of the resistive element is within the resistive element value range stipulated by the predetermined upper limit resistance value and lower limit resistance value.

Also, the resistive element of the first form of the present invention is a variable resistive element that changes resistance value based on the power source voltage; and wherein the control unit controls the resistance value of the resistive element to a virtual resistance value when an absolute voltage level of the power source is higher than a predetermined reference voltage; and wherein the control unit controls the resistance value of the resistive element to be smaller than the virtual resistance value when the absolute voltage level of the power source is lower than the predetermined reference voltage.

Further, the resistive element of the first form of the present invention is configured of a plurality of sub-resistive elements, wherein the control unit controls the resistance values of the resistive elements connected between the other end of the switch and power source or ground line, based on the power source voltage.

Further, the resistive element of the first form of the present invention is configured of a plurality of sub-resistive elements having generally the same on-resistance value, wherein in the event that the power source voltage is lower than the predetermined reference voltage the control unit connects in parallel a greater number of on-resistance values of the sub-resistive elements than the number of on-resistance values of sub-resistive elements that are connected in the event that the power source voltage is higher than the predetermined reference voltage.

Also, the resistive element of the first form of the present invention is configured of a plurality of sub-resistive elements having mutually different on-resistance values, wherein the control unit selects from the on-resistance values of the plurality of sub-resistive elements one or multiple on-resistance values of the sub-resistive elements connected between the other end of the switch and power source or ground line, based on the power source voltage.

Also, the control unit of the first form of the present invention has predetermined mutually different multiple reference voltages.

Also, the resistive element of the first form of the present invention is a transistor that is turned on for intervals matching the timing for determining the voltage level at the other end of the switch.

Further, the first form of the present invention comprises: a switch connected at one end to a ground line or a power source; a resistive element connected between the other end of the switch and a power source or a ground line; and a resistive element value switching circuit for switching the value of the resistive element based on power source voltage which is the difference between the voltage level of the power source and the ground level of the ground line; wherein the voltage level at the other end of the switch is judged and signals equivalent to the switching state of the switch corresponding to the voltage level at the other end of the switch are output.

Further, the first form of the present invention comprises a latch circuit for determining the voltage level at the other end of the switch and outputting signals equivalent to the switching state of the switch.

Further, the latch circuit of the first form of the present invention determines the voltage level at predetermined intervals.

Also, the resistive element of the first form of the present invention is a variable resistive element that changes resistance value based on the power source voltage; and wherein the resistance value switching circuit switches the resistance value of the resistive element to a virtual resistance value when an absolute voltage level of the power source is higher than a predetermined reference voltage; and wherein the resistance value switching circuit switches the resistance value of the resistive element to be smaller than the virtual resistance value when the absolute voltage level of the power source is lower than the predetermined reference voltage.

A second form of the present invention comprises: a power source for supplying electric power; a voltage detecting unit for detecting the voltage of the power source; a switch connected at one end to a ground line or a power source; a resistive element connected between the other end of the switch and a power source or a ground line; a control unit for controlling the value of the resistive element based on power source voltage which is the difference between the voltage level of the power source detected by the voltage detecting unit and the ground level of the ground line; a determination unit that determines the voltage level at the other end of the switch, and outputs signals corresponding to the switching state of the switch; and a processing unit that executes processing in accordance with a switching state of the switch represented by signals output by the determination unit.

Further, the determination unit of the present invention determines the voltage level at predetermined intervals.

Also, the resistive element of the second form of the present invention is a variable resistive element which changes resistance value based on the power source voltage; and wherein the control unit controls the resistance value of the resistive element to a virtual resistance value when an absolute voltage level of the power source is higher than a predetermined reference voltage; and wherein the control unit controls the resistance value of the resistive element to be smaller than the virtual resistance value when the absolute voltage level of the power source is lower than the predetermined reference voltage.

Also, the processing unit of the second form of the present invention comprises a timing unit for executing various timing processes in accordance with the switching state of the switch.

Also, the power source of the second form of the present invention contains a battery unit for storing electric power generated by an electricity generating unit.

Further, the second form of the present invention comprises a voltage control unit for controlling output voltage from the battery unit, in accordance with the voltage detected by the voltage detecting unit.

BEST MODE FOR CARRYING OUT THE INVENTION

Next, the best mode for carrying out the present invention will be described with reference to the drawings.

1 FIRST EMBODIMENT

1.1 Circuit Configuration of Detecting Circuit

Figure 1:
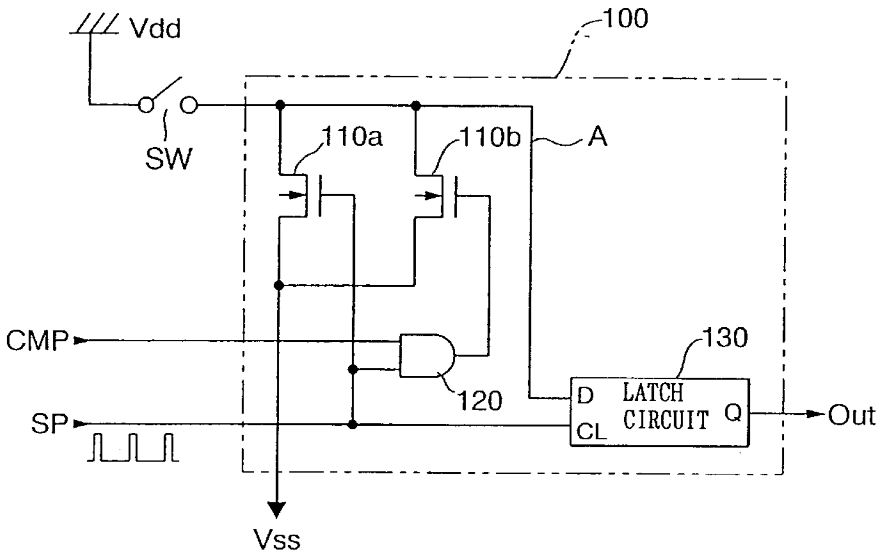
FIG. 1 is a circuit diagram illustrating the configuration of a detecting circuit for detecting the switching state of a switch relating to a first embodiment of the present invention.

FIG. 1 is a circuit diagram illustrating the configuration of the detecting circuit 100 according to the first embodiment of the present invention.

As shown in FIG. 1, one end of the switch SW, of which the switching state is to be detected, is connected to the high-potential side reference level Vdd, and the other end of the switch SW is connected to the detecting circuit 100.

Now, the detecting circuit 100 is configured of n-channel field-effect transistors 110*a* and 110*b*, an AND circuit 120, and a latch circuit 130.

Of these, the transistors 110*a* and 110*b* are both of the same type, with approximately the same capabilities, and with the drain of each being connected to the other end of the switch SW. On the other hand, the source of each is connected to the negative power source voltage Vss.

Also, sampling pulses SP are supplied to the gate of the transistor 110*a*, and the gate of the transistor 110*b* is connected to the output terminal of the AND circuit 120. Now, this AND circuit 120 is for outputting the logical product of CMP signals which are at the "H" level in the event that the difference between the power source voltage Vss and the reference level Vdd, which is the ground level, is equal to or smaller than a threshold value Vth, and the sampling pulses SP, having been supplied from a later-described voltage detecting circuit 440 (see FIG. 9).

Figure 17:
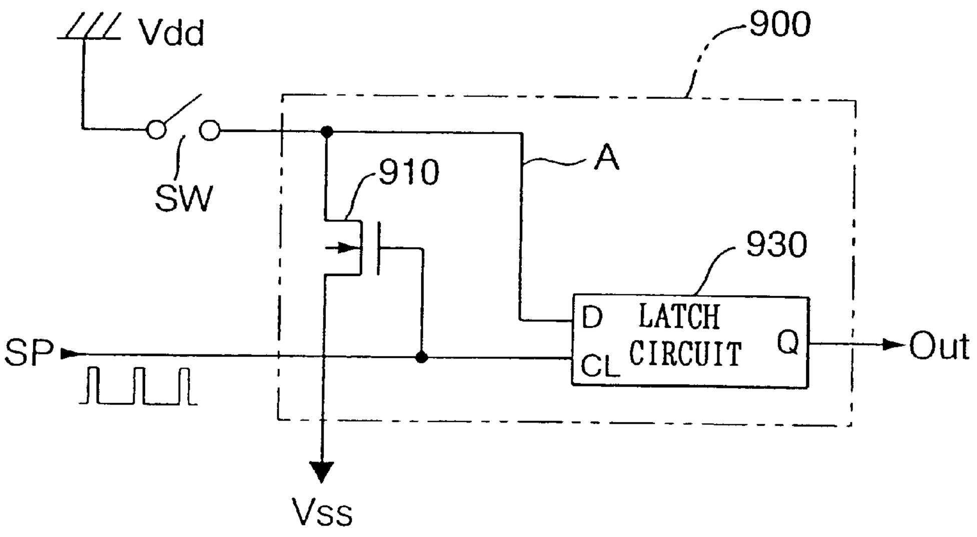
FIG. 17 is a circuit diagram illustrating the configuration of a conventional switch switching state detecting circuit.

Also, the latch circuit 130 is for latching the voltage level of the signal line A connected to the other end of the switch SW with the trailing edge of the sampling pulse SP so as to output the switching state of the switch SW as the signal Out, as with the latch circuit 930 in FIG. 17.

1.2 Operation of Detecting Circuit

Figure 2:
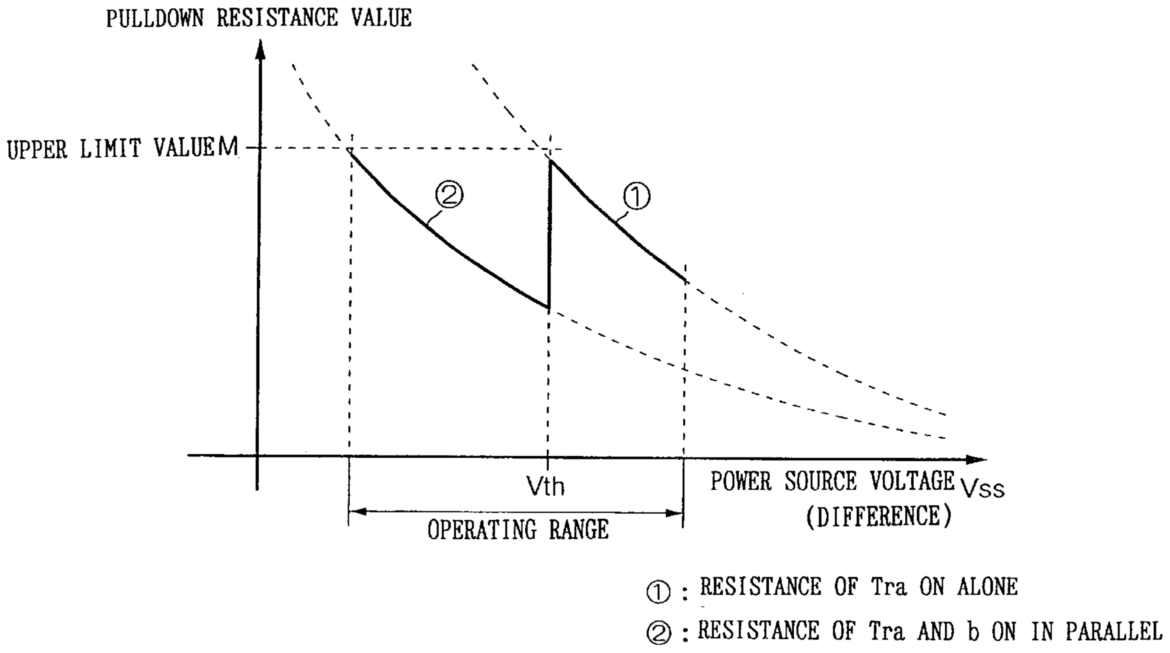
FIG. 2 is a diagram for describing the action of the detecting circuit of the first embodiment.

Next, the operation of the detecting circuit 100 will be described with reference to FIG. 1 and FIG. 2. Here, FIG. 2 is a diagram for illustrating the relation between the power source voltage Vss and the resistance value for pulling down the signal line A. Incidentally, in this FIG. 2, the power source voltage Vss is used as the horizontal axis, but in reality the power source voltage Vss is a negative power source, so in precise terms, this is the difference between the power source voltage Vss and reference level Vdd (=|Vdd−Vss|), or, the right side is a negative axis.

Now, in the event that the voltage difference is greater than the threshold value Vth, the signal CMP goes to the "L" level, so only the transistor 110*a* is on during the period wherein the sampling pulse SP is at the "H" level, thereby pulling down the signal line A. Accordingly, there is no difference with the conventional detecting circuit 900 if only this point is examined.

Further, when discharge of the power source proceeds and the difference between the power source voltage Vss and the reference level Vdd drops below the threshold value Vth, the signal CMP goes to the "H" level, so the AND circuit 120 opens, and the output of the AND circuit 120 is at the "H" level.

Now, the threshold value Vth is set to a voltage level which is equivalent to a value short of the upper limit value M wherein the voltage level of the signal line A is determined in a sure manner under the on resistance of the transistor 110*a*.

In the state wherein the AND circuit 120 is open, both transistors 110*a* and 110*b* turn on during the period wherein the sampling pulse SP is at the "H" level", and the signal line A is pulled down by the parallel connection of on resistance. Accordingly, the resistance value for pulling down the signal line A is approximately half of that in the event that only the transistor 110*a* is on, as shown by ② in FIG. 2, so the voltage level of the signal line A is pulled down in a sure manner.

More commonly, the voltage level of the signal line A is pulled down in a sure manner by using a transistor (i.e., a variable resistor which changes in resistance value according to the power source voltage), and in the event that the voltage is compared at the absolute value, the resistance value obtained by assuming the resistance value set by the control means in the event that the power source voltage (|Vdd−Vss|) is higher than a predetermined reference voltage (which is Vth) to have been measured by the detecting circuit 100 (which is equivalent to control unit) under power source voltage conditions lower than the predetermined reference voltage is taken as a virtual resistance value (equivalent to the broken line portion extended from the curve ① in FIG. 2 toward the low-voltage side), and in the event that voltage is compared at the absolute values thereof, the control circuit 100 performs control so that the resistor value to be set in the event that the power source voltage is lower than the predetermined reference value is made smaller than the virtual resistance value under the power source voltage conditions, i.e., by controlling the value of the resistor to a value such as shown by the curve ② in FIG. 2. This point is the same for individual reference voltages (the later-described Vth1, Vth2, etc.) in cases wherein there are multiple reference voltages, as with the later-described third variation.

1.3 Advantages of the Invention

Thus, according to the detecting circuit 100 relating to the first embodiment, in the event that the difference between the power source voltage Vss and the reference level Vdd is greater than the threshold value Vth, only the transistor 110*a* turns on during the "H" level period of the sampling pulse SP, thereby suppressing electric power consumption, while in the event that the difference is equal to or lower than the threshold value Vth, both transistors 110*a* and 110*b* turn on, thereby stabilizing the voltage level of the signal line A, so even in the event that the power voltage Vss fluctuates over a certain width, both low power consumption and improvement in detection precision can be realized.

In other words, the range of the power source voltage Vss wherein the voltage level of the signal line A is stabilized is restricted to the area equal to or greater than the threshold value Vth in a conventional configuration wherein the signal line A is pulled down only by one transistor, but according to the detecting circuit 100 according to the embodiment, this can be expanded to and below the threshold value Vth.

1.4 Variations of the First Embodiment

Incidentally, the present invention is not restricted to the detecting circuit 100 according to the above-described embodiment, rather, various application and variations can be made.

1.4.1 First Variation

Figure 3:
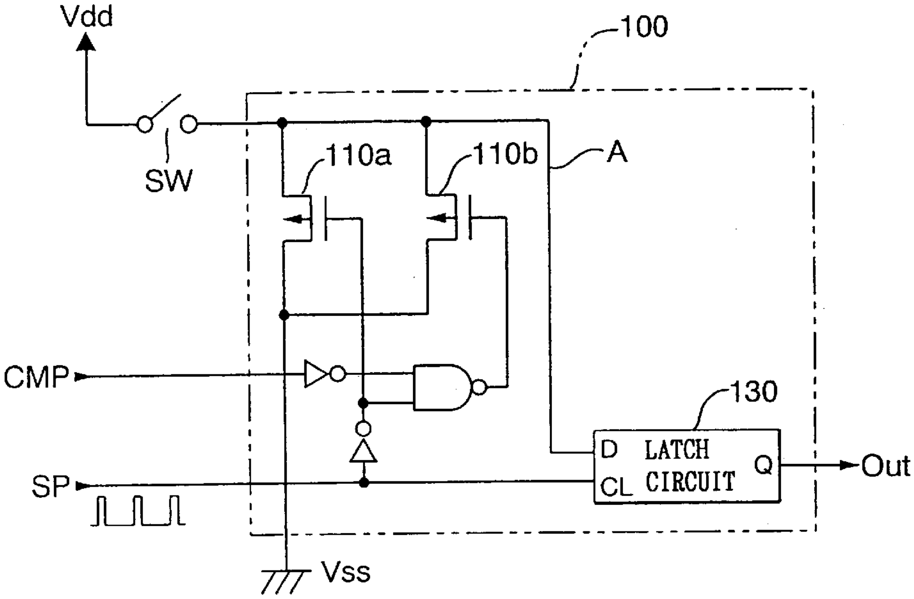
FIG. 3 is a circuit diagram illustrating the configuration of a first variation of the detecting circuit of the first embodiment.

For example, with the detecting circuit 100 according to the embodiment, description has been made of a type wherein the power source voltage is a negative power source, but application can be made to a type wherein the power source voltage is a positive power source with the transistors 110*a* and 110*b* as p-channels types, as shown in FIG. 3.

1.4.2 Second Variation

Also, an arrangement may be conceived wherein the transistors 110*a* and 110*b* are not of the same type as with the embodiment, but rather one with a relatively great on resistance is used as the transistor 110*a* and one with a relatively small on resistance is used as the transistor 110*b*, wherein the transistors are selectively turned on according to the power source voltage, i.e., only the transistor 110*a* is turned on in the event that the power source voltage is high, and only the transistor 110*b* is turned on in the event that the power source voltage is low.

1.4.3 Third Variation

Further, an arrangement may be conceived wherein not only two transistors are provided, but three or more are provided in a parallel array, and wherein the number of transistors to be turned on is gradually increased as the power source voltage drops.

1.4.3.1 Specific Configuration of Third Embodiment

Figure 4:
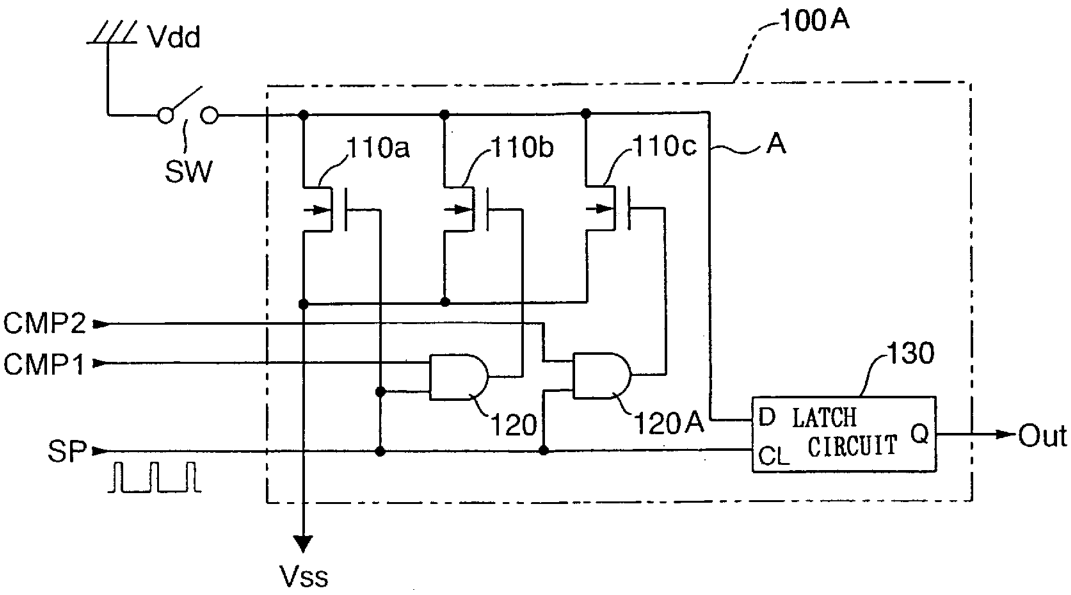
FIG. 4 is a circuit diagram illustrating the configuration of a third variation of the detecting circuit of the first embodiment.

The circuit diagram in FIG. 4 shows a more specific configuration of the detecting circuit 100A in an arrangement wherein three transistors are provided in a parallel array.

As shown in FIG. 4, one end of the switch SW, of which the switching state is to be detected, is connected to the reference level Vdd at the high-potential side, and the other end of the switch SW is connected to the detecting circuit 100.

Now, the detecting circuit 100A is configured of n-channel field-effect transistors 110*a*, 110*b*, and 110*c*, AND circuits 120 and 120A, and a latch circuit 130.

Of these, the transistors 110*a*, 110*b*, and 110*c* are all of the same type, with approximately the same capabilities, and while the drain of each is connected to the other end of the switch SW, the source of each is connected to the negative side power source voltage Vss.

Also, sampling pulses SP are provided to the gate of the transistor 100*a*, the gate of the transistor 110*b* is connected to the output end of the AND circuit 120, and the gate of the transistor 110*c* is connected to the output end of the AND circuit 120A.

Now, the AND circuit 120 is for outputting the logical product of CMP1 signals, supplied from an unshown voltage detecting circuit or the like, which are at the "H" level in the event that the difference between the power source voltage Vss and the reference level Vdd which is the ground level is equal to or smaller than a threshold value Vth1, and the sampling pulses SP. Also, the AND circuit 120A is for outputting the logical product of CMP2 signals, supplied from an unshown voltage detecting circuit or the like, which are at the "H" level in the event that the difference between the power source voltage Vss and the reference level Vdd which is the ground level is equal to or smaller than a threshold value Vth2 (smaller than Vth1), and the sampling pulses SP.

Further, the latch circuit 130 is for latching the voltage level of the signal line A connected to the other end of the switch SW with the trailing edge of the sampling pulse SP so as to output the switching state of the switch SW as the signal Out, as with the latch circuit 930 in FIG. 17.

1.4.3.2 Operation of the Detecting Circuit of the Third Variation

Figure 5:
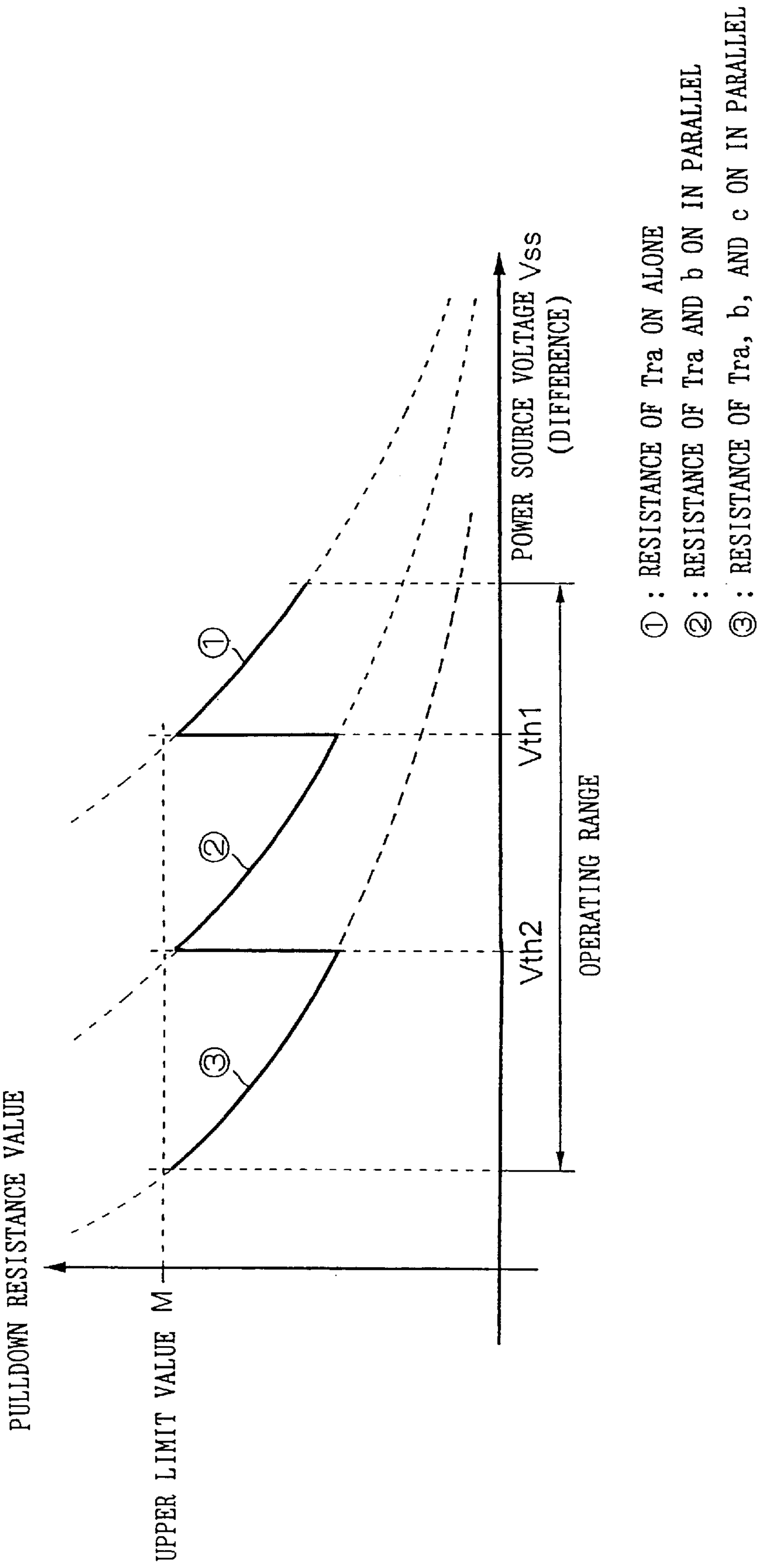
FIG. 5 is a diagram for describing the action of the third variation of the detecting circuit of the first embodiment.

Next, the operation of the detecting circuit 100A will be described with reference to FIG. 4 and FIG. 5. FIG. 5 is a diagram for illustrating the relation between the power source voltage Vss, and the resistance value for pulling down the signal line A, as with FIG. 2.

Now, in the event that the voltage difference is greater than the threshold value Vth1, the signal CMP1 goes to the "L" level and the signal CMP2 goes to the "L" level, so only the transistor 110*a* is on during the period wherein the sampling pulse SP is at the "H" level, thereby pulling down the signal line A. Accordingly, there is no difference with the conventional detecting circuit 900 if only this point is examined.

Further, when discharge of the power source proceeds and the difference between the power source voltage Vss and the reference level Vdd drops below the threshold value Vth1, the signal CMP1 goes to the "H" level, so the AND circuit 120 opens, and the output of the AND circuit 120 is at the "H" level. Also, the signal CMP2 remains at the "L" level, so the AND circuit 120A remains closed, and the output of the AND circuit 120A remains at the "L" level.

Now, the threshold value voltage Vth1 is set to a voltage level which is equivalent to a value short of the upper limit value M wherein the voltage level of the signal line A is determined in a sure manner under the on resistance of the transistor 110*a*.

In the state wherein the AND circuit 120 is open, both transistors 110*a* and 110*b* turn on during the period wherein the sampling pulse SP is at the "H" level", and the signal line A is pulled down by the parallel connection of on resistance. Accordingly, the resistance value for pulling down the signal line A is approximately half of that in the event that only the transistor 110*a* is on, as shown by ② in FIG. 5, so the voltage level of the signal line A is pulled down in a sure manner.

Moreover, when discharge of the power source further proceeds and the difference between the power source voltage Vss and the reference level Vdd drops below the threshold value Vth2, the signal CMP1 and the signal CMP2 go to the "H" level, so the AND circuit 120 and the AND circuit 120A open, and the output of the AND circuit 120 and the AND circuit 120A are at the "H" level.

Now, the threshold value voltage Vth2 is set to a voltage level which is equivalent to a value short of the upper limit value M wherein the voltage level of the signal line A is determined in a sure manner under the parallel on resistance of the transistor 110*a* and transistor 100*b*.

In the state wherein the AND circuit 120 and the AND circuit 120A are open, all of the transistors 110*a*, 110*b*, and 110*c* turn on during the period wherein the sampling pulse SP is at the "H" level", and the signal line A is pulled down by the parallel connection of on resistance. Accordingly, the resistance value for pulling down the signal line A is approximately ⅓ of that in the event that only the transistor 110*a* is on, as shown by ③ In FIG. 5, so the voltage level of the signal line A is pulled down in a sure manner.

1.4.4 Fourth Variation

In addition, a configuration may be made wherein the form of connection from the one end of the switch SW to the power source voltage is controlled according to power source voltage. For example, a configuration may be conceived wherein the resistance is connected in a serial manner in the event that the power source voltage is high, and the resistance is connected in a parallel manner in the event that the power source voltage is low.

1.4.5 Fifth Variation

Figure 6:
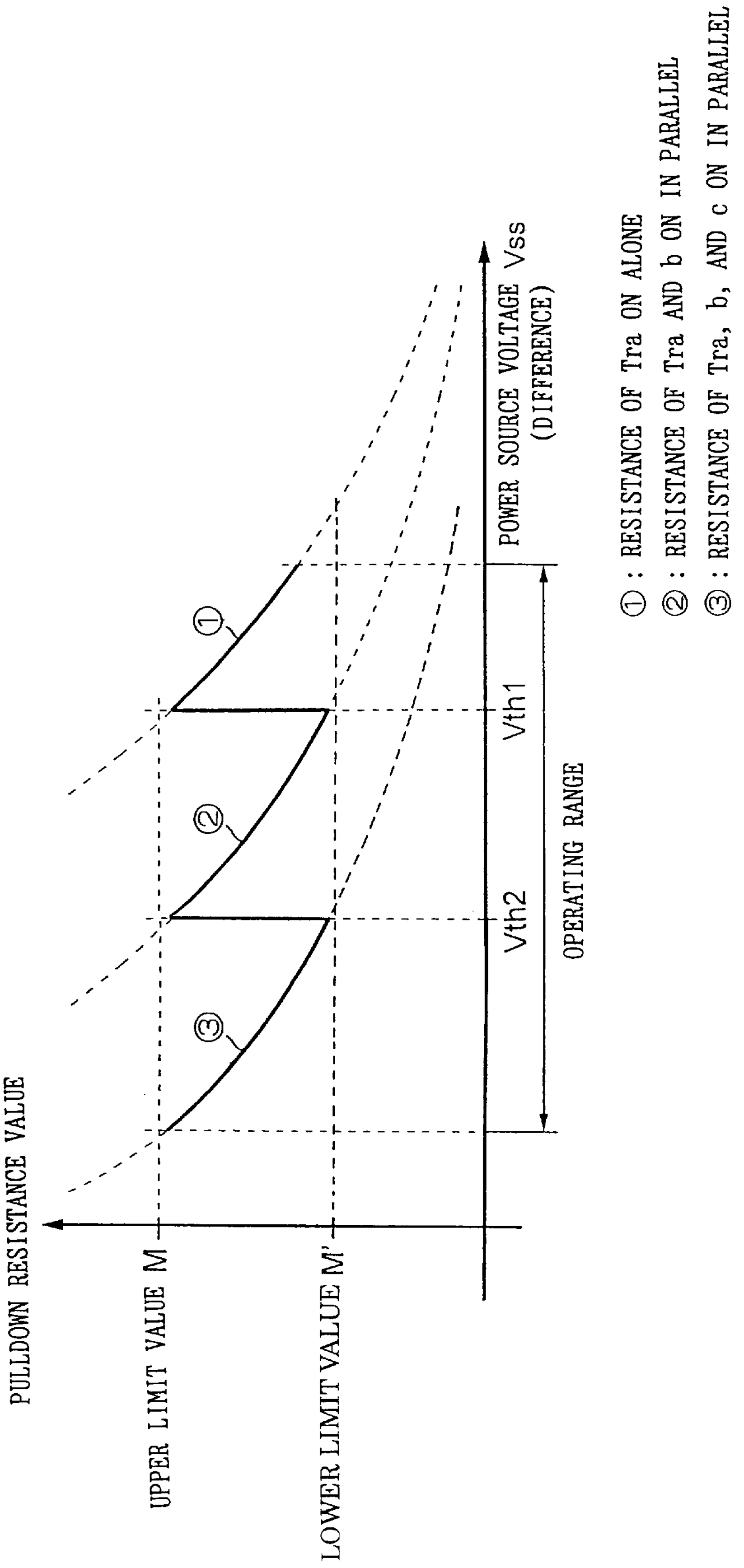
FIG. 6 is an explanatory diagram of the configuration of a fifth variation of the detecting circuit of the first embodiment.

Though in the above description, the threshold value voltage is set to a voltage level which is equivalent to a value short of the upper limit value M wherein the voltage level of the signal line A is determined in a sure manner under the on resistance of the transistor or the parallel on resistance of multiple transistors, but a configuration may be made such as shown in FIG. 6, wherein the threshold value voltage is set to a voltage level which is equivalent to a value short of the lower limit value M' wherein the amount of current at the time of the switch SW being on is a predetermined current amount, in which range the voltage level of the signal line A is determined in a sure manner, so that the current flowing through the transistors for lowering the electric power consumption at the time of turning the switch SW on does not become too great.

1.4.6 Sixth Embodiment

In the above first embodiment and the variations thereof, the state of the switch SW is described as being detected at predetermined intervals corresponding to the sampling pulses SP, but a configuration may be made wherein the state of the switch SW is detected continuously.

More specifically, the AND circuit 120 and latch circuit 130 shown in FIG. 1 are omitted, a predetermined voltage is applied to the gate of the transistor 110*a* so as to maintain an on state constantly, the signals CMP are directly input to the gate of the transistor 100*b*, and the voltage level of the signal line A is directly output as signals Out indicating the switching state of the switch SW.

1.5 Electronic Apparatus

Next, a description will be made regarding an example of applying the detecting circuit 100 according to the first embodiment to an actual electronic apparatus.

Figure 7:
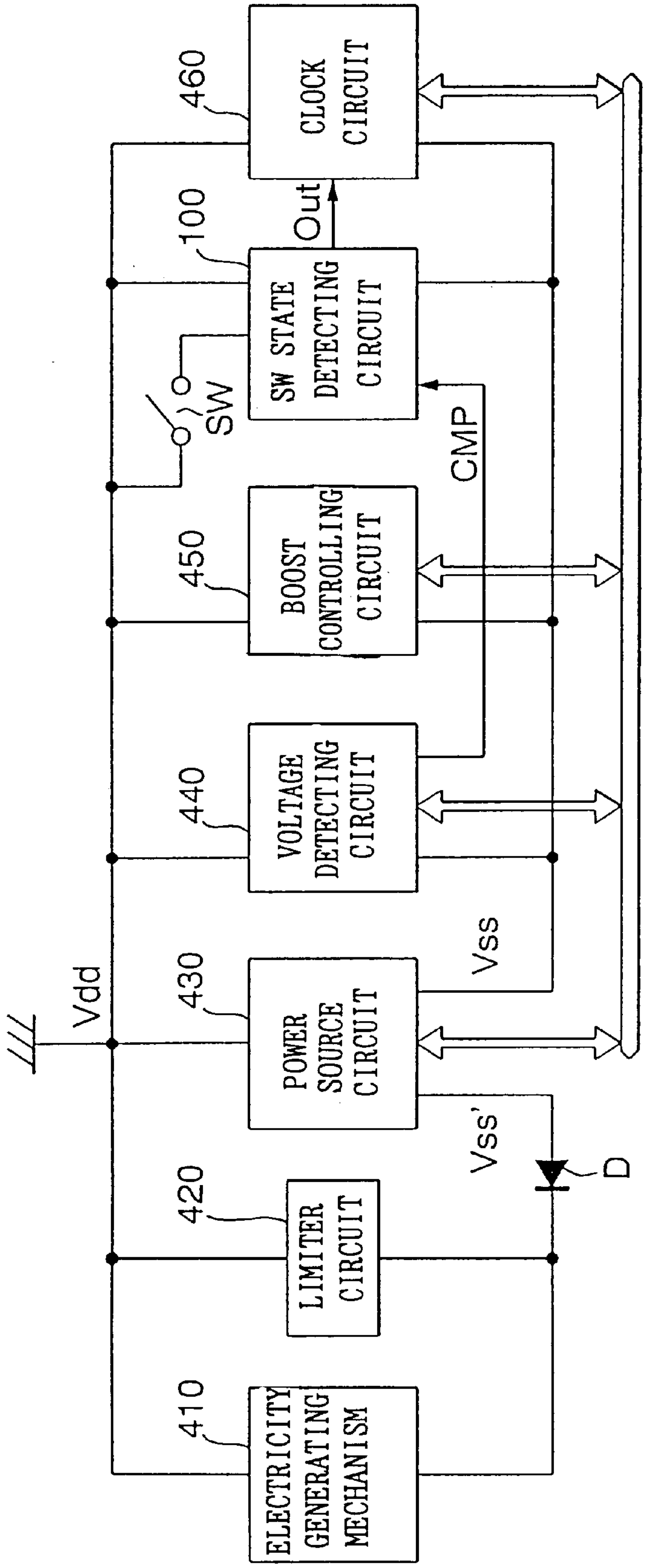
FIG. 7 is a block diagram illustrating a configuration of an electronic timepiece as an example of an electronic apparatus to which the detecting circuit of the first embodiment is applied.

FIG. 7 is a block diagram illustrating the configuration of an electronic timepiece as an example of an electronic apparatus. Making a general description of this electronic timepiece, electric power generated by the electricity generating mechanism 410 is charged to the power source circuit 430, and the charged electric power is supplied to the components, wherein the electronic timepiece has 1/10 second chronograph functions other than normal time display functions, and the start/stop of the timing action in the chronograph functions is instructed by the switching of the switch SW.

1.5.1 Configuration of Electronic Timepiece

The following is a description of the components of the electronic timepiece.

1.5.1.1 Electricity Generating Mechanism

First, the details of the electricity generating mechanism 410 will be described with reference to FIG. 8.

Figure 8:
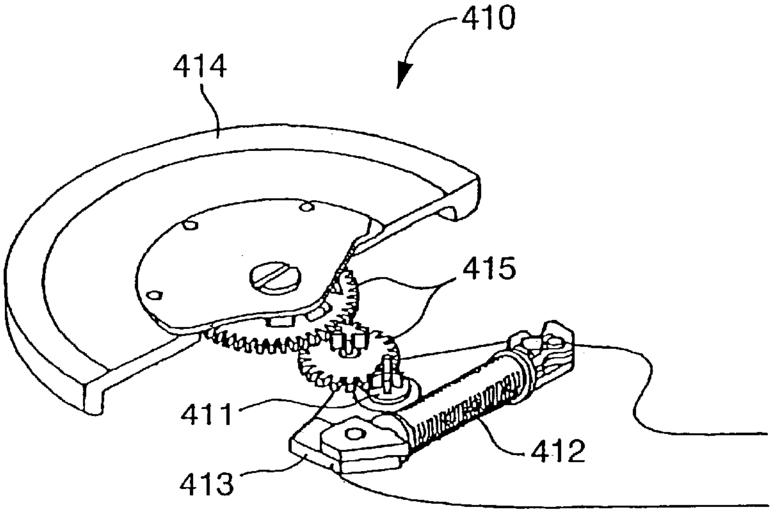
FIG. 8 is a perspective view illustrating the configuration of the electricity generating mechanism in the electronic timepiece shown in FIG. 7.

As shown in FIG. 8, the electricity generating mechanism 410 comprises a bipolarized disk-shaped rotor 411 and a stator 413 around which an output coil 412 is wound. In this configuration, in the event that the person wearing the electronic timepiece swings his/her arm, a rotating weight 414 moves in circles, and this action rotates the rotor 411 by the gear train mechanism 415, electromotive force is generated in the output coil 412 due to this rotation, and alternating current output is extracted therefrom.

Figure 12:
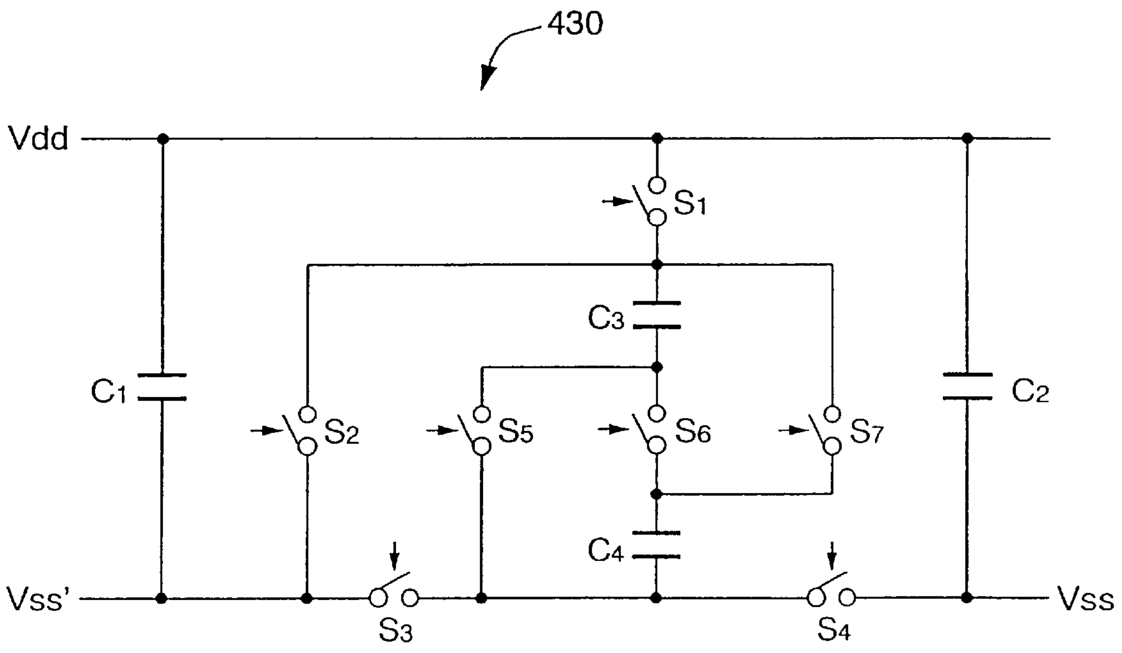
FIG. 12 is a circuit diagram illustrating the configuration of the power source circuit in the electronic timepiece shown in FIG. 7.

As shown in FIG. 7, the alternating current output which is extracted from the electricity generating mechanism 410 is changed into a direct current by a rectifying diode D, and is charged to a capacitor C1 of the later-described power source circuit 430 (FIG. 12). Accordingly, more accurately, the voltage of the capacitor C1 is the output voltage of the electricity generating mechanism 410 minus the forward voltage of the rectifying diode D.

1.5.1.2 Limiter Circuit

The limiter circuit 420 is for preventing overcharging of this capacitor C1, and more specifically is for conducting in the event that the voltage of the capacitor C1 which has been boosted by charging reaches a rated value or higher, thereby bypassing the charging current.

1.5.1.3 Power Source Circuit

Though the power source circuit 430 will be described later in detail, this comprises multiple capacitors including the capacitor C1 and multiple switches, and charges the capacitor C1 with electric power generated by the electricity generating mechanism 410, and also boosts the output voltage of the capacitor C1 in steps and supplies this to the components as power source voltage Vss.

1.5.1.4 Voltage Detecting Circuit

The voltage detecting circuit 440 detects the power source voltage Vss (the difference between power source voltage Vss and reference level Vdd), and firstly outputs signals CMP for the "H" level in the event that this is equal to or smaller than the threshold voltage Vth, and secondly notifies the boost control circuit 450 of the detected power source voltage Vss.

Now, the specific configuration of the voltage detecting circuit 440 will be described.

Figure 9:
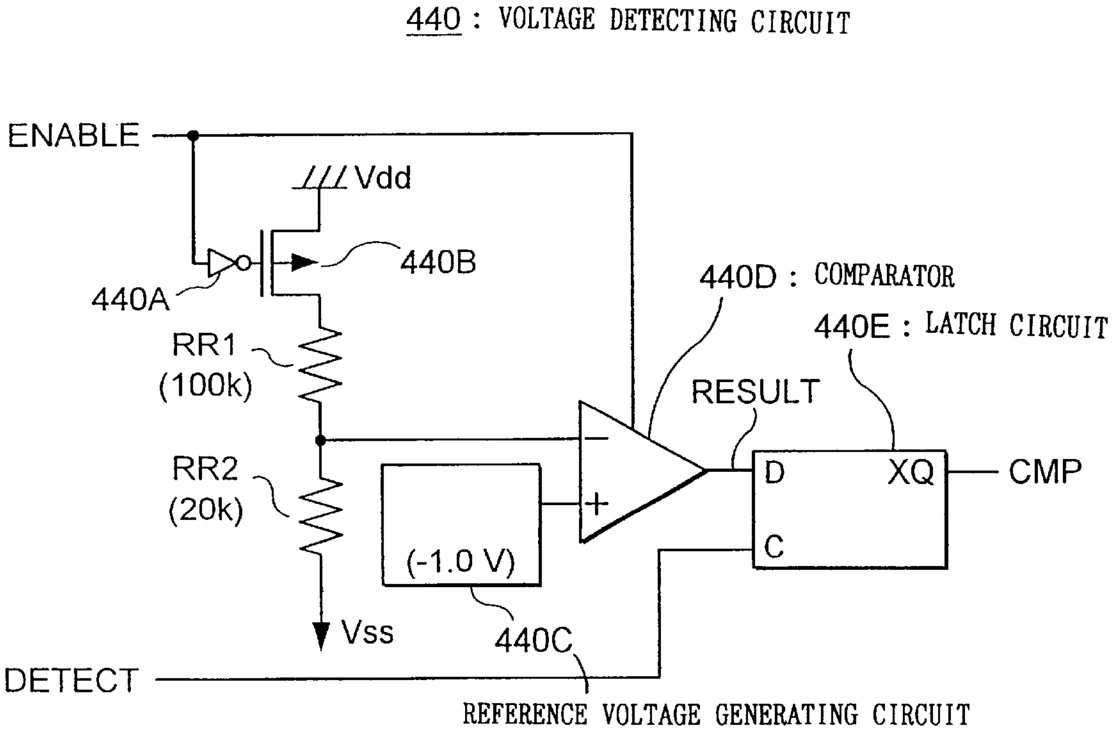
FIG. 9 is a block diagram illustrating the configuration of the main components of the voltage detecting circuit in the electronic timepiece shown in FIG. 7.

FIG. 9 illustrates an overview configuration block diagram of the primary components of the voltage detecting circuit 440.

The voltage detecting circuit 440 comprises: an inverter 440A wherein an enable signal ENABLE is input to the input terminal in the event that the level is "H" is a predetermined period including the voltage detecting timing; a p-channel MOS transistor 440B wherein reference level Vdd is applied to the source terminal, and the output terminal of the inverter 440A is connected to the gate terminal thereof; a first voltage divider resistor RR1 of which one end is connected to the drain terminal of the p-channel MOS transistor 440B, a second voltage divider resistor RR2 of which one end is connected to the first voltage divider resistor RR1 and the other end is applied with the power source voltage Vss, a reference voltage generating circuit 440C for generating a reference voltage, a comparator 440D wherein the inverse input terminal is connected to an intersection between the first voltage divider resistor and the second voltage divider resistor, the non-inverse input terminal is connected to the reference voltage generating circuit 440C, with the enable signal ENABLE input to the control terminal, so as to output the comparison results as comparison result data RESULT; and a latch circuit 440E wherein a voltage detection timing signal DETECT for the "H" level is input to the timepiece terminal C before the voltage detection timing, the comparison result data RESULT is input to the data terminal D, and signals CMP are output from the inverse output terminal XQ.

In FIG. 9, the numeric values in the parentheses are more specific numeric value examples, and in the event that the reference level Vdd=0.0 [V] and the power source voltage Vss=−1.2 [V], the first voltage divider resistor RR1=100 [kΩ], the second voltage divider resistor RR2=20 [kΩ], and the reference voltage of the reference voltage generating circuit 440C=−1.0 [V].

Next, the voltage detecting operation of the voltage detecting circuit 440 will be described with reference to FIG. 10 and FIG. 11.

The enable signal ENABLE goes to the "H" level for a predetermined period every 2 [sec].

Then, while the enable signal ENABLE is at the "H" level, the inverter 440A outputs output signals of the "L" level, and the p-channel MOS transistor 440B turns on. In the same way, the comparator 440D also enters an operative state.

Consecutively, the power source voltage Vss is divided by the first voltage divider resistor RR1 and the second voltage divider resistor RR2, and is input to the inversion input terminal of the comparator 440D as voltage to be the object of comparison.

Consequently, the comparator 440D compares the reference voltage generated by the reference voltage generating circuit 440C and the voltage to be the object of comparison, and the comparison results are output to the data terminal D of the latch circuit 440E as comparison result data RESULT.

Figure 10:
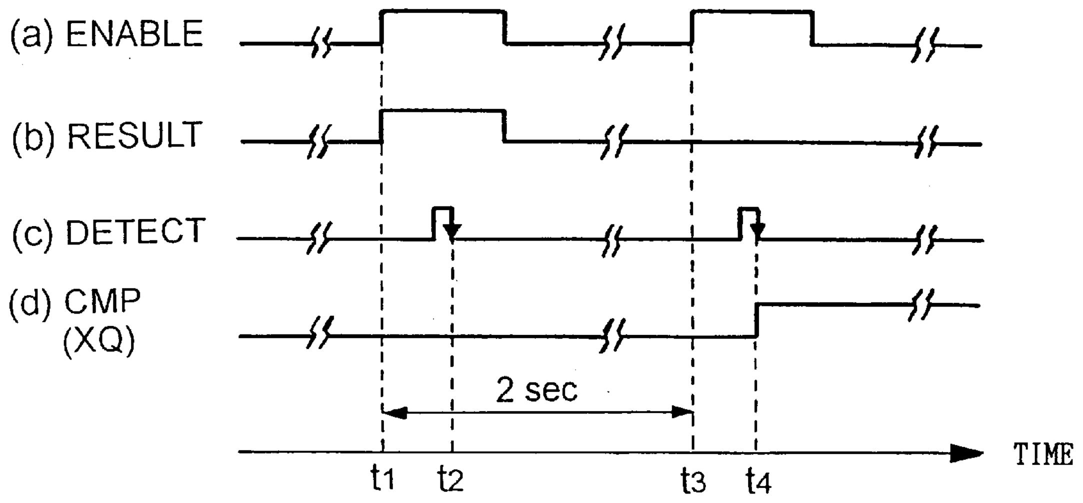
FIGS. 10*a*–10*d* are diagram for explaining the action of the voltage detecting circuit.

In this case, in the event that the comparison object voltage is lower than the reference voltage generated by the reference voltage generating circuit 440C, the comparison result data RESULT="H" level as shown at time t1 in FIG. 10, and the comparison result data RESULT is taken into the latch circuit 440E when the voltage detection timing signal DETECT falls at time t2.

However, in this case, the inverse output terminal XQ is already at the "L level, so the signals CMP output from the inverse output terminal XQ do not change at all.

Conversely, in the event that the comparison object voltage is higher than the reference voltage generated by the reference voltage generating circuit 440C, the comparison result data RESULT="L" level during the period wherein the sampling pulse SP is at the "H" level as shown at time t3 in FIG. 10, and the comparison result data RESULT is taken into the latch circuit 440E when the voltage detection timing signal DETECT falls at time t4.

In this case, the signals CMP output from the inverse output terminal XQ make a transition from the "L" level to the "H" level.

Figure 11:
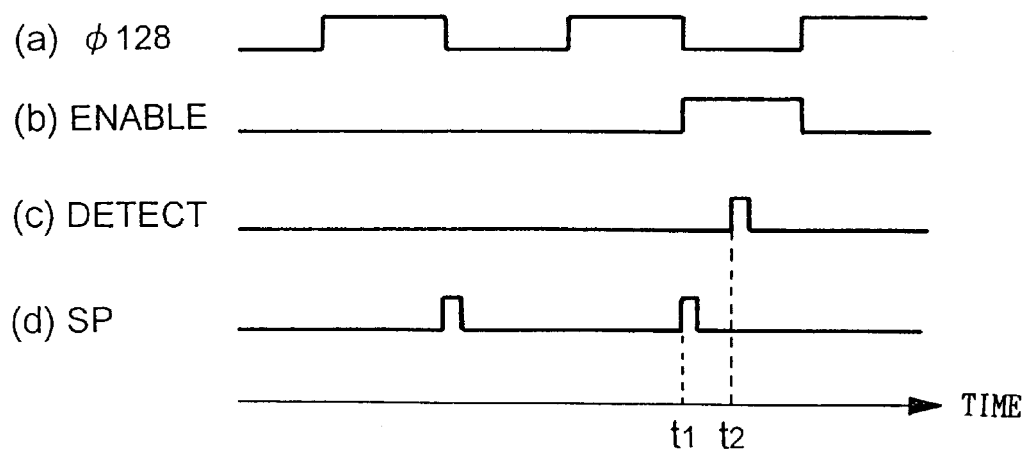
FIGS. 11*a*–11*d* are diagram for describing the relation between sampling pulses and voltage detecting timing.

At the time of performing these determinations, the input timing of the sampling signals SP to be input to the latch circuit 130 of the detecting circuit 110 and the input timing of the voltage detection timing signal DETECT must be set so as to be different, as indicated by time t1 and time t2 in FIG. 11. This is because in the event that the input timing of the sampling pulse SP and the input timing of the voltage detection timing signal DETECT are the same, detection results are undefined.

Incidentally, in FIG. 11, the signal Ø 128 is a 1/128 second cycle reference signal used for realizing the 1/10 chronograph, and the sampling pulse SP and enable signal ENABLE are synchronous with the signal Ø 128.

1.5.1.5 Boost Control Circuit

The boost control circuit 450 is for supplying control signals for controlling switching to the switches of the power source circuit 430 according to the power source voltage Vss detected by the voltage detecting circuit 440, and controlling the boosting of the power source circuit 430.

1.5.1.6 Switch

The switch SW is for instructing start/stop of the chronograph function by the switching thereof, with one end grounded, and the other end connected to the detecting circuit 100. Now, the detecting circuit 100 relates to the above embodiment, and is for detecting the switching state of the switch SW and outputs the signal Out indicating the state thereof. The timepiece circuit 460 is for executing the chronograph function according to the signal Out, in addition to normal time display functions. Incidentally, an oscillating circuit not shown here also supplies boost/charge switch-over signals for the boost control circuit 450, sampling pulses SP for the detecting circuit 100, and time display and chronograph reference signals for the timepiece circuit 460.

1.5.2 Details of the Power Source Circuit

The detailed configuration of the power source circuit 430 will be described with reference to FIG. 12. As shown in FIG. 12, the power source circuit 430 is made up of capacitors C1 through C4 and switches S1 through S7, and is of a configuration for charging the electric power generated by the electricity generating mechanism 410 to the capacitor C1, and boosting the output voltage Vss' of the capacitor C1 in steps and supplying the output voltage Vss' of the capacitor C1 to the components as power source voltage Vss by the switches S1 through S7. Here, the switches S1 through S7 are configured of transmission gates or transistors, in reality.

1.5.2.1 Specific Operation of the Power Source Circuit

Figure 13:
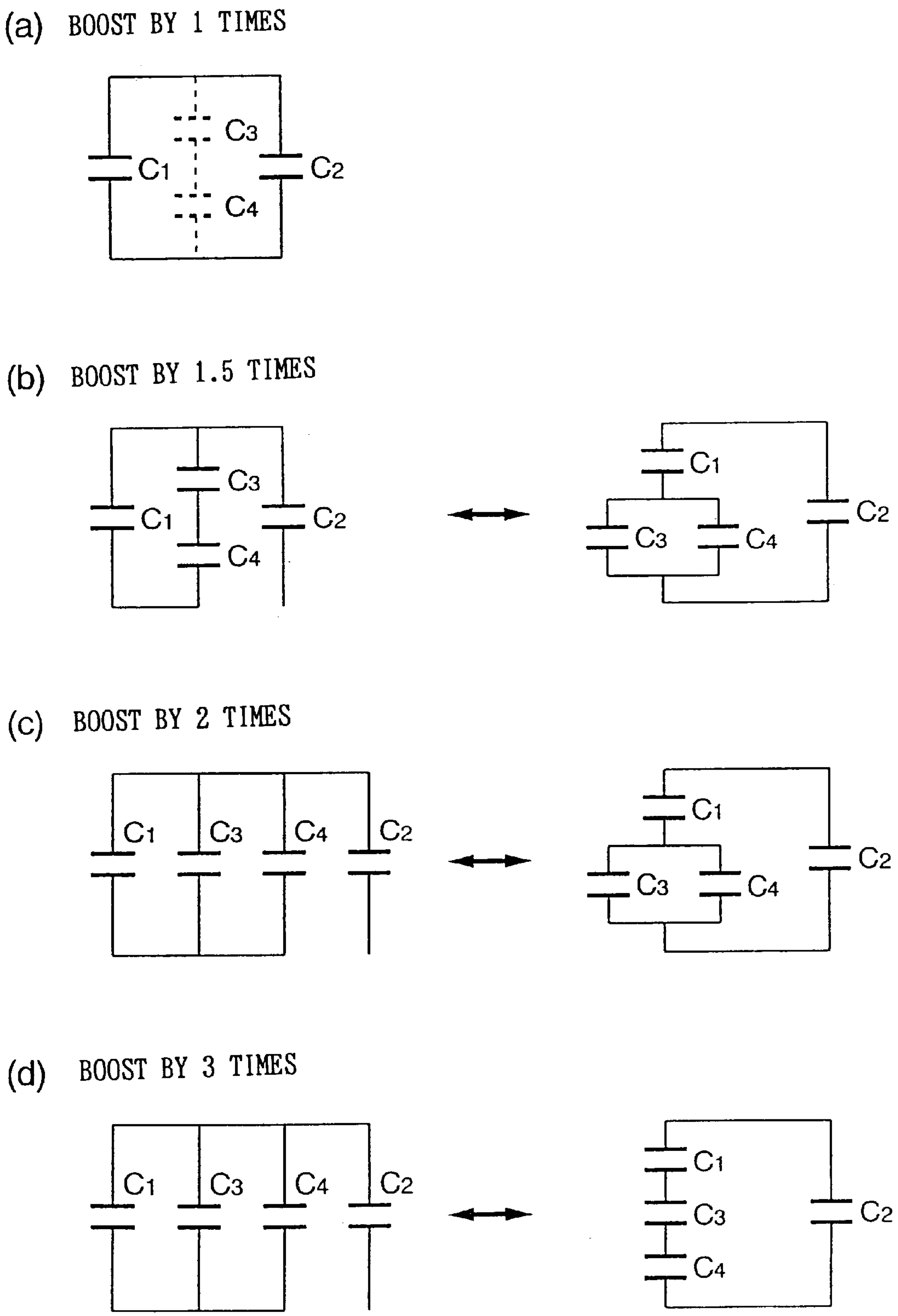
FIGS. 13*a*–13*d* are simplified diagram illustrating the equivalent circuit at the time of charging and boosting in the power source circuit shown in FIG. 12.

Description will be made of the operation of the power source circuit 430 thus configured, under assumption of a case wherein the voltage range wherein the components can operate is 0.9 to 1.8 V, and wherein no generation of electricity has been performed by the electricity generating mechanism 410 following the capacitor C1 having been charged full. In this case, the power source circuit 430 operates so that the capacitors C1 and C2 are charged to the same potential at first. Specifically, only the switches S3 and S4 are turned on by the boost control circuit 450, while the other switches are controlled so as to be off. Consequently, the power source circuit 430 becomes equivalent to the circuit shown in FIG. 13(*a*), so the output voltage Vss' of the capacitor C1 is output as is as the power source voltage Vss. Next, as the discharge of the capacitor C1 proceeds and the power source voltage Vss reaches 1.2 V at time t1 shown in FIG. 14, the power source circuit 430 performs an action of boosting the output voltage Vss' of the capacitor C1 to 1.5 times.

In detail, once detection is made by the voltage detecting circuit 440 that the power source voltage Vss has reached 1.2 V, the boost control circuit 450 which has received the notification of the detection results first performs control so that the switches S1, S3, and S6 are turned on, and the other switches are off. Consequently, the power source circuit 430 becomes equivalent to the circuit shown to the left in FIG. 13(*b*), so the capacitors C3 and C4 are each charged at voltage 0.5 times of the output voltage Vss' from the capacitor C1.

Subsequently, the boost control circuit 450 performs control so that the switches S2, S4, S5, and S7 are turned on, and the other switches are off. Consequently, the power source circuit 430 becomes equivalent to the circuit shown to the right in FIG. 13(*b*), and the capacitor C2 is charged by serial connection to the capacitor C1 and the capacitor C3 (C4) charged at voltage 0.5 times thereof, and consequently, voltage 1.5 times of the output voltage Vss' from the capacitor C1 is output as the power source voltage Vss.

Figure 14:
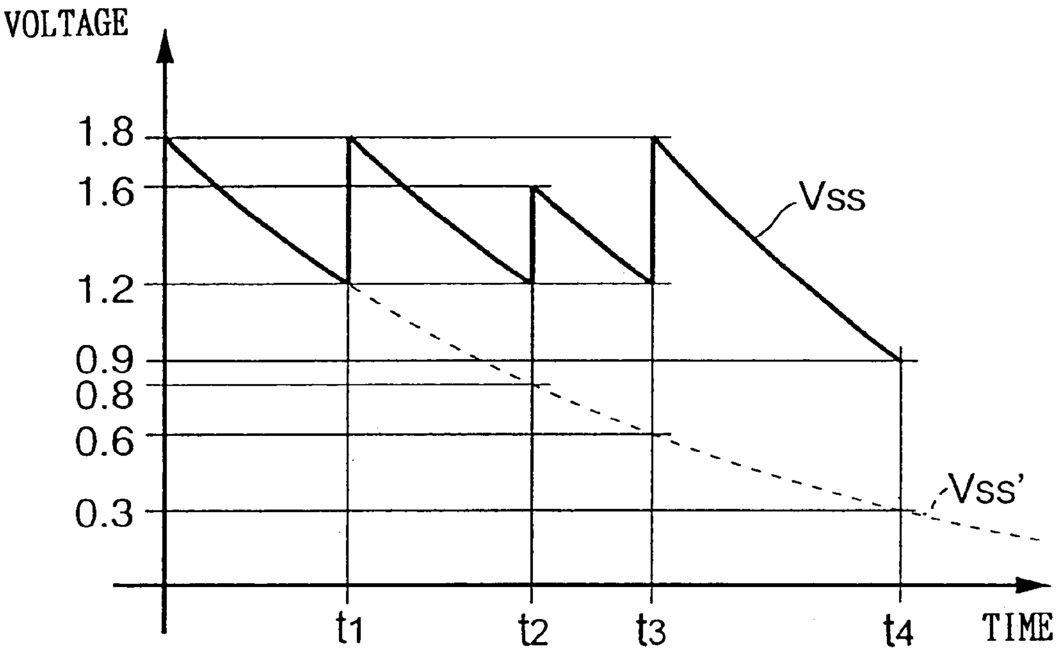
FIG. 14 is a diagram for describing the action of charging and boosting in the power source circuit shown in FIG. 12.

Further, as the discharge of the capacitor C1 proceeds and the power source voltage Vss reaches 1.2 V at time t2 shown in FIG. 14, the power source circuit 430 performs an action of boosting the output voltage Vss' of the capacitor C1 to 2 times.

In detail, once detection is made by the voltage detecting circuit 440 that the power source voltage Vss has reached 1.2 V again, the boost control circuit 450 which has received the notification of the detection results first performs control so that the switches S1, S3, S5, and S7 are turned on, and the other switches are off. Consequently, the power source circuit 430 becomes equivalent to the circuit shown to the left in FIG. 13(*c*), so the capacitors C3 and C4 are each charged at voltage 1 times of the output voltage Vss' from the capacitor C1.

Subsequently, the boost control circuit 450 performs control so that the switches S2, S4, S5, and S7 are turned on, and the other switches are off. Consequently, the power source circuit 430 becomes equivalent to the circuit shown to the right in FIG. 13(*c*), and the capacitor C2 is charged by serial connection to the capacitor C1 and the capacitor C3 (C4) charged at voltage 1 times thereof, and consequently, voltage 2 times of the output voltage Vss' from the capacitor C1 is output as the power source voltage Vss.

Then, as the discharge of the capacitor C1 proceeds further and the power source voltage Vss reaches 1.2 V at time t3 shown in FIG. 14, the power source circuit 430 performs an action of boosting the output voltage Vss' of the capacitor C1 to 3 times.

In detail, once detection is made by the voltage detecting circuit 440 that the power source voltage Vss has reached 1.2 V yet again, the boost control circuit 450 which has received the notification of the detection results first performs control so that the switches S1, S3, S5, and S7 are turned on, and the other switches are off. Consequently, the power source circuit 430 becomes equivalent to the circuit shown to the left in FIG. 13(*d*), so the capacitor C3 and C4 are each charged at voltage 1 times of the output voltage Vss' from the capacitor C1.

Subsequently, the boost control circuit 450 performs control so that the switches S2, S4, and S6 are turned on, and the other switches are off. Consequently, the power source circuit 430 becomes equivalent to the circuit shown to the right in FIG. 13(*d*), and the capacitor C2 is charged by triple serial connection with the capacitor C1 and the capacitor C3 charged at the same voltage thereof and as with the capacitor C4, and consequently, voltage 3 times of the output voltage Vss' from the capacitor C1 is output as the power source voltage Vss.

Now, the operation description here has been made under the assumption of a case wherein electric power generated by the electricity generating mechanism 410 has stopped, but conversely, in the event that electric power is generated by the electricity generating mechanism 410, and the electric power generated exceeds the electric power consumed by the circuit components, the capacitor C1 is charged, so the output voltage Vss' thereof rises.

Now, in the event that the output voltage Vss' of the capacitor C1 rises due to generation of electricity, and consequently the power source voltage Vss reaches 1.8 V, action is executed for the boosting multiples to be lowered by steps. For example, in the event that the boosting multiples are currently 3, 2, and 1.5 times, once the power source voltage Vss reaches 1.8 V, the boost control circuit 450 controls the power source circuit 430 such that the boosting multiples are 2, 1.5, and 1 times, respectively.

In this way, with the power source circuit 430, in the event that the power source voltage Vss drops to 1.2 V action is executed for raising the boosting multiple one level, and on the other hand, in the event that the power source voltage Vss rises to 1.8 V action is executed for lowering the boosting multiple one level, whereby even in the event that the output voltage Vss' of the capacitor C1 charged with generated electric power is between 0.3 and 0.9 V which is out of the operable voltage range, the power source voltage is maintained to 0.9 to 1.8 V which is within the operable voltage range, so the charged electric power is used effectively, and the operating time can be extended to time t4 shown in FIG. 14, for example.

1.5.3 Advantages of the Electronic Timepiece

Also, according to this electronic timepiece, start/stop of the chronograph function is instructed by the switching of the switch SW, and the switching state of this switch is detected by the detecting circuit 100, so both reduced electricity consumption and improved detection precision can be realized.

Moreover, with this electronic timepiece, detection of the electric power source Vss which is necessary for boosting of the power source circuit 430 and switching transistors in the detecting circuit 100 is executed by a common voltage detecting circuit 440, so the circuit configuration is also simplified.

Particularly, selecting and designing the transistors 110*a* and 110*b* (and further the transistor 110*c*) within the detecting circuit 100 so that the threshold value Vth is 1.2 V makes this the same as the 1.2 V which is the voltage level serving as the judgement reference for boosting, saving the need to increase voltage levels to judge, and thus simplification of the circuit configuration can be furthered even more.

1.5.4 Variation of the Electronic Timepiece

Incidentally, in the above electronic timepiece, the main entity for charging of electric power generated by the electricity generating mechanism has been described as the capacitor C1, but a secondary battery capable of storing electricity is sufficient. Also, all sorts of electricity generating mechanisms may be used besides that shown in FIG. 5, such as solar batteries, thermoelectric generating devices, piezoelectric generating devices, and so forth.

Also, examples of electronic apparatuses to which the detecting circuit 100 according to the present embodiment can be applied besides the above electronic timepiece include liquid crystal televisions, video tape recorders, notebook type personal computers, cellular telephones, PDAs (Personal Digital Assistant: personal information terminal), calculators, etc.

2 Second Embodiment

Next, the detecting circuit of the second embodiment will be described.

2.1 Circuit Configuration of the Detecting Circuit

Figure 15:
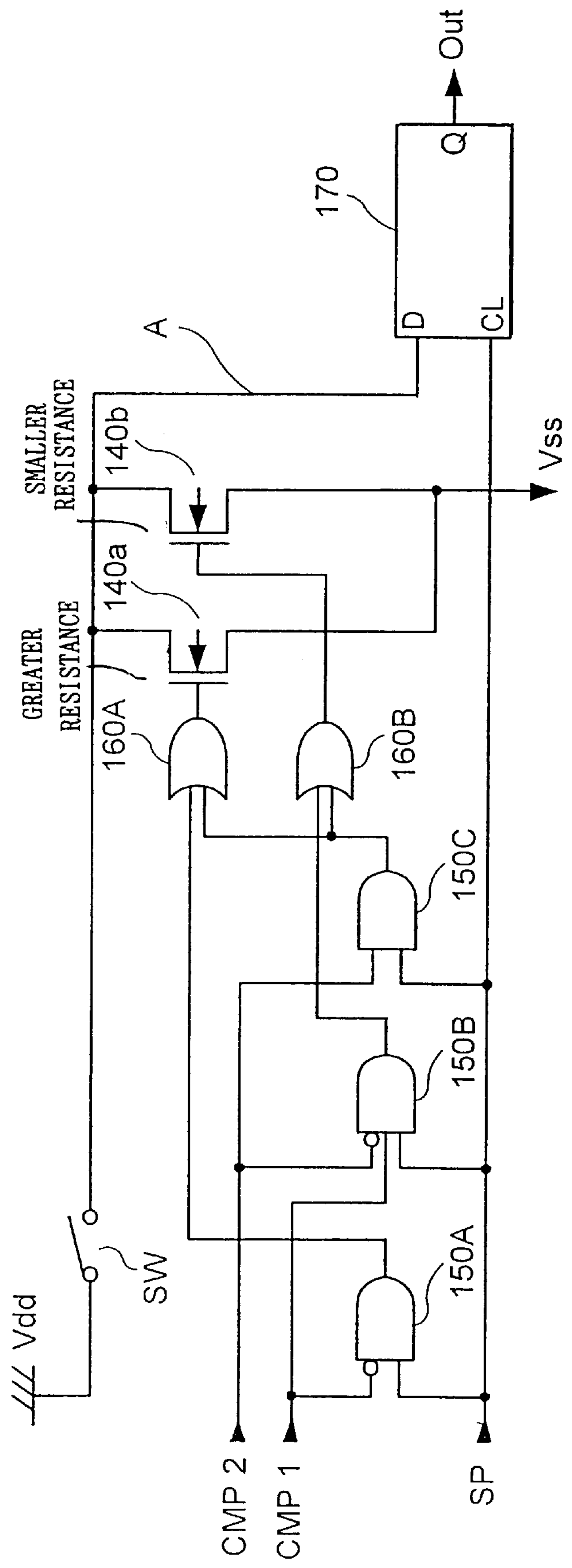
FIG. 15 is a circuit diagram illustrating the configuration of the detecting circuit for detecting the switching state of a switch according to a second embodiment of the present invention.

FIG. 15 is a circuit diagram illustrating the configuration of the detecting circuit 100B according to the second embodiment of the present invention.

As shown in FIG. 15, one end of the switch SW of which the switching state is to be detected is connected to the high-potential side reference level Vdd, and the other end of the switch SW is connected to the detecting circuit 100B.

Now, the detecting circuit 100B is configured of n-channel field-effect transistors 140*a* and 140*b*, two-input AND circuits 150A and 150C, a three-input AND circuit 150B, OR circuits 160A and 160B, and a latch circuit 170.

Of these, the transistor 140*a* has a greater impedance (resistance value) as compared to the transistor 140*b*, with the drain of each being connected to the other end of the switch SW, and on the other hand, the source of each is connected to the negative side power source voltage Vss.

Also, the AND circuit 150A is for outputting the logical product of inverse signals of the signal CMP1, and sampling pulses SP.

Now, the signal CMP1 is a signal which is supplied from the voltage detecting circuit and the like, and is at the "H" level in the event that the difference between the power source voltage Vss and the reference level Vdd which is the ground level is smaller than a threshold value Vth1.

Further, the AND circuit 150B is for outputting the logical product of three signals, i.e., inverse signals of the signal CMP1 and signal CMP2, and sampling pulses SP.

Here, the signal CMP2 is a signal which is supplied from the voltage detecting circuit and the like, and is at the "H" level in the event that the difference between the power source voltage Vss and the reference level Vdd which is the ground level is smaller than a threshold value Vth2 (<Vth1).

Further, the AND circuit 150C is for outputting the logical product of the signal CMP1, and sampling pulses SP.

Also, the OR circuit 160A is for outputting the logical sum of the output signals of the AND circuit 150A and the output signals of the AND circuit 150C.

Further, the OR circuit 160B is for outputting the logical sum of the output signals of the AND circuit 150B and the output signals of the AND circuit 150C.

Also, the latch circuit 170 is for latching the voltage level of the signal line A connected to the other end of the switch SW with the trailing edge of the sampling pulse SP so as to output the switching state of the switch SW as the signal Out, as with the latch circuit 930 in FIG. 17.

2.2 Operation of Detecting Circuit

Figure 16:
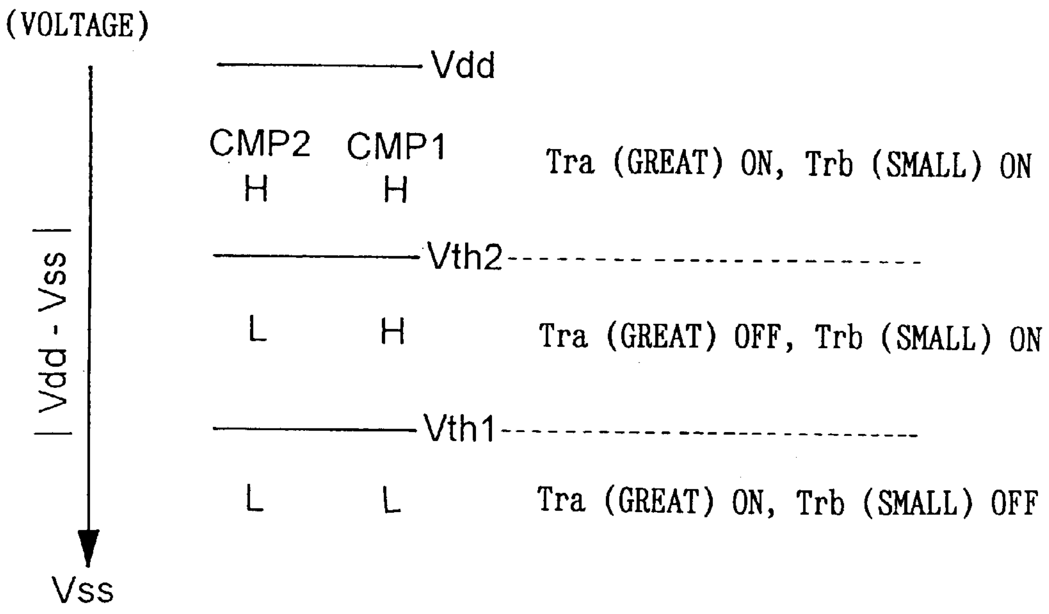
FIG. 16 is a diagram for describing the action of the detecting circuit of the second embodiment.

Next, the operation of the detecting circuit 100B will be described with reference to FIG. 16.

In the event that the difference between the power source voltage Vss and reference level Vdd (=|Vdd−Vss |) is equal to or greater than the threshold value Vth1, the signals CMP1 and CMP2 goes to the "L" level, so during the period wherein the sampling pulse SP is at the "H" level, the output of the AND circuit 150A is "H", the output of the AND circuit 150B is "L", and the output of the AND circuit 150C is "L".

Consequently, the output of the OR circuit 160A is "H", and the output of the OR circuit 160B is "L", and during the period wherein the sampling pulse SP is at the "H" level, only the transistor 140*a* which has a greater impedance (resistance value) as compared to the transistor 140*b* is on, thereby pulling down the signal line A.

Further, when discharge of the power source proceeds and the difference between the power source voltage Vss and the reference level Vdd drops below the threshold value Vth1 but is equal to or greater than the threshold value Vth2, the signal CMP2 goes to the "L" level and the signal CMP1 goes to the "H" level, so during the period wherein the sampling pulse SP is at the "H" level, the output of the AND circuit 150A is "L", the output of the AND circuit 150B is "H", and the output of the AND circuit 150C is "L".

Consequently, the output of the OR circuit 160A is "L", and the output of the OR circuit 160B is "H", and during the period wherein the sampling pulse SP is at the "H" level, only the transistor 140*b* is on, thereby pulling down the signal line A.

Further, when discharge of the power source proceeds and the difference between the power source voltage Vss and the reference level Vdd drops below the threshold value Vth2, the signals CMP1 and CMP2 go to the "H" level and the signal CMP1 goes to the "H" level, so during the period wherein the sampling pulse SP is at the "H" level, the output of the AND circuit 150A is "L", the output of the AND circuit 150B is "L", and the output of the AND circuit 150C is "H".

Consequently, the output of the OR circuit 160A is "H", and the output of the OR circuit 160B is "H", and during the period wherein the sampling pulse SP is at the "H" level, the transistor 140*a* and the transistor 140*b* is on, thereby pulling down the signal line A.

Thus, the resistance value for pulling down the signal line A is gradually lowered in conjunction with the dropping of the power source voltage, so the voltage level of the signal line A can be pulled down in a sure manner.

2.3 Advantages of the Second Embodiment

Thus, according to the detecting circuit 100B relating to the second embodiment, in the event that the difference between the power source voltage Vss and the reference level Vdd is greater than the threshold value Vth1, only the transistor 140*a* with the greater resistance value turns on during the "H" level period of the sampling pulse SP, thereby suppressing electric power consumption, while in the event that the difference is equal to or lower than the threshold value Vth1 but greater than the threshold value Vth2, only the transistor 140B with the smaller resistance value turns on, thereby suppressing electric power consumption and also pulling down in a sure manner, and further, in the event that the difference is lower than the threshold value Vth2, both transistors 140*a* and 140*b* turn on, thereby stabilizing the voltage level of the signal line A, so even in the event that the power voltage Vss fluctuates over a certain width, both low power consumption and improvement in detection precision can be realized.

3 Advantages of the Embodiments

According to the present embodiments described above, the value of a resistor connected between one end of the switch of which the switching state is to be detected and the power source or ground line is controlled by a control circuit according to the voltage level of the power source, so the range or operating voltage can be widened, and both low power consumption and improvement in detection precision can be realized.

Examples of improved detection precision here include;

(1) Erroneous detection of on/off of the switch does not occur easily.

(2) The on time or off time of the switch can be recognized accurately.

(3) The transition state of the switch, the transition from the on state to the off state and the transition from the off state to the on state can be grasped in a short time from the point in time of operating the switch.

What is claimed is:

1. A switching state detecting device for a switch, comprising:

a switch connected at one end to one of a ground line and a power source;

a resistive element connected between the other end of said switch and the other of said power source and said ground line;

a control unit that controls a resistance value of said resistive element in accordance with a difference between a voltage level of said power source and a ground level of said ground line; and an output line on the other end of said switch that outputs signals equivalent to the switching state of said switch corresponding to the voltage level of said power source.

2. A switching state detecting device for a switch according to claim 1, comprising a determination unit that determines the voltage level at the other end of said switch and outputs signals equivalent to the switching state of said switch.

3. A switching state detecting device for a switch according to claim 2, wherein said determination unit determines said voltage level at predetermined intervals.

4. A switching state detecting device for a switch according to claim 2, wherein said control unit controls the resistance value of said resistive element such that the resistance value of said resistive element does not exceed a predetermined upper limit resistance value.

5. A switching state detecting device for a switch according to claim 2, wherein said control unit controls the resistance value of said resistive element such that the resistance value of said resistive element is within a resistive element value range between a predetermined upper limit resistance value and a lower limit resistance value.

6. A switching state detecting device for a switch according to claim 2, wherein said resistive element is a variable resistive element that changes resistance value based on said power source voltage;

and wherein said control unit controls the resistance value of said resistive element to a virtual resistance value when an absolute voltage level of said power source is higher than a predetermined reference voltage;

and wherein said control unit controls the resistance value of said resistive element to be smaller than said virtual resistance value when the absolute voltage level of said power source is lower than said predetermined reference voltage.

7. A switching state detecting device for a switch according to claim 6, wherein said resistive element comprises a plurality of sub-resistive elements;

and wherein said control unit controls the resistance values of the sub-resistive elements connected between the other end of said switch and said one of the power source and ground line, based on said power source voltage.

8. A switching state detecting device for a switch according to claim 6, wherein said resistive element comprises a plurality of sub-resistive elements having generally the same on-resistance value;

and wherein in the event that said power source voltage is lower than said predetermined reference voltage said control unit connects in parallel a greater number of on-resistance values of said sub-resistive elements than the number of on-resistance values of said sub-resistive elements that are connected in the event that said power source voltage is higher than said predetermined reference voltage.

9. A switching state detecting device for a switch according to claim 6, wherein said resistive element comprises a plurality of sub-resistive elements having mutually different on-resistance values;

and wherein said control unit selects from said on-resistance values of said plurality of sub-resistive elements one or multiple on-resistance values of said sub-resistive elements connected between the other end of said switch and said one of the power source and ground line, based on said power source voltage.

10. A switching state detecting device for a switch according to claim 6, wherein said control unit has predetermined mutually different multiple reference voltages.

11. A switching state detecting device for a switch according to claim 2, wherein said resistive element is a transistor that is turned on for intervals matching the timing for determining the voltage level at the other end of said switch.

12. A switching state detecting device for a switch, comprising:

a switch connected at one end to one of a ground line and a power source;

a resistive element connected between the other end of said switch and the other of said power source and said ground line; and a resistance value switching circuit for switching a resistance value of said resistive element in accordance with a difference between a voltage level of said power source and a ground level of said ground line; and an output line on the other end of said switch that outputs signals equivalent to the switching state of said switch corresponding to the voltage level of said power source.

13. A switching state detecting device for a switch according to claim 12, comprising a latch circuit for determining the voltage level at the other end of said switch and outputting signals equivalent to the switching state of said switch.

14. A switching state detecting device for a switch according to claim 13, wherein said latch circuit performs determination of said voltage level at predetermined intervals.

15. A switching state detecting device for a switch according to claim 13, wherein said resistive element is a variable resistive element that changes resistance value based on said power source voltage;

and wherein said resistance value switching circuit switches the resistance value of said resistive element to a virtual resistance value when an absolute voltage level of said power source is higher than a predetermined reference voltage;

and wherein said resistance value switching circuit switches the resistance value of said resistive element to be smaller than said virtual resistance value when the absolute voltage level of said power source is lower than said predetermined reference voltage.

16. An electronic apparatus, comprising:

a power source for supplying electric power;

a voltage detecting unit that detects the voltage of said power source;

a switch connected at one end to one of a ground line and said power source;

a resistive element connected between the other end of said switch and the other of said power source and said ground line;

a control unit that controls a resistance value of said resistive element in accordance with a difference between a voltage level of said power source detected by said voltage detecting unit and a ground level of said ground line;

a determination unit that determines the voltage level at the other end of said switch, and outputs signals corresponding to the switching state of said switch; and a processing unit that executes processing in accordance with a switching state of said switch represented by signals output by said determination unit.

17. An electronic apparatus according to claim 16, wherein said determination unit determines said voltage level at predetermined intervals.

18. An electronic apparatus according to claim 16, wherein said resistive element is a variable resistive element that changes resistance value based on said power source voltage;

and wherein said control unit controls the resistance value of said resistive element to a virtual resistance value when an absolute voltage level of said power source is higher than a predetermined reference voltage;

and wherein said control unit controls the resistance value of said resistive element to be smaller than said virtual resistance value when the absolute voltage level of said power source is lower than said predetermined reference voltage.

19. An electronic apparatus according to claim 16, wherein said processing unit comprises a timing unit that executes various timing processes in accordance with the switching state of said switch.

20. An electronic apparatus according to claim 16, wherein said power source contains a battery unit that stores electric power generated by an electricity generating unit.

21. An electronic apparatus according to claim 20, comprising a voltage control unit that controls an output voltage from said battery unit in accordance with the voltage detected by said voltage detecting unit.

* * * * *